(12) United States Patent  
Nagler et al.

(10) Patent No.: US 7,823,744 B2
(45) Date of Patent: *Nov. 2, 2010

(54) STORAGE CONTAINER FOR WATER-ENDANGERING LIQUIDS

(75) Inventors: Norbert Nagler, Haltern (DE); Reiner Stolze, Dorsten (DE); Werner Wychlacz, Schermbeck (DE)

(73) Assignee: Ruhr Oel GmbH (DE)

( * ) Notice: Subject to any disclaimer, the term of this patent is extended or adjusted under 35 U.S.C. 154(b) by 820 days.

This patent is subject to a terminal disclaimer.

(21) Appl. No.: 11/614,093

(22) Filed: Dec. 21, 2006

(65) Prior Publication Data

US 2007/0221673 A1  Sep. 27, 2007

Related U.S. Application Data

(63) Continuation of application No. 10/468,845, filed on Jan. 30, 2004, now Pat. No. 7,171,978.

(51) Int. Cl.
B65D 1/34 (2006.01)
B65D 90/02 (2006.01)
B65D 88/00 (2006.01)
B65D 90/00 (2006.01)
D06F 39/08 (2006.01)
F16K 23/00 (2006.01)
F16K 43/00 (2006.01)
F16K 51/00 (2006.01)
F16L 55/18 (2006.01)

(52) U.S. Cl. .................... 220/571; 220/565; 220/567.2; 137/312; 137/318

(58) Field of Classification Search ................. 220/571, 220/565, 567.2; 137/312, 318
See application file for complete search history.

(56) References Cited

U.S. PATENT DOCUMENTS 7,171,978 B2 * 2/2007 Nagler et al. ............... 137/312

* cited by examiner

*Primary Examiner*—Anthony Stashick
*Assistant Examiner*—Andrew T Kirsch

(57) ABSTRACT

A storage container for water-endangering liquids comprises a leakage detection and restraint system. The storage container provides a container that allows for a short-notice alarm system and that minimizes the collection volume, that is to ensure that the water-endangering liquid spreads as little as possible, as well as to reduce construction and maintenance costs. The storage container is characterized by the following features: a gutter (4) surrounding the tank (13) that is directly contiguous with the outer wall (2) of the storage container and that collects leaked liquid, at least one gutter outlet (14), at least one liquid collection container (6), and at least one detection system (12) for the water-endangering liquids. The gutter outlet (14) is adapted to guide the liquid collected in the gutter (4) to the liquid collection container (6) that is provided with the detection system (12).

5 Claims, 2 Drawing Sheets

STORAGE CONTAINER FOR WATER-ENDANGERING LIQUIDS

This application is a continuation of Ser. No. 10/468,845 filed Jan. 30, 2004, now U.S. Pat. No. 7,171,978.

BACKGROUND OF THE INVENTION

The invention relates to a storage container for liquids hazardous to water, having a leak detection and retention system.

Due to legal or official regulations, storage containers for liquids hazardous to water are often equipped with collection basins that are capable of capturing the maximum storage volume of the tank. These collection basins are made of a concrete or cohesive base, possibly of steel. Collection basins lined with synthetic films are also known. The size of the collection basins requires cost-intensive maintenance. When product leaks from the tank, liquid hazardous to water spreads across a large surface and generally triggers an alarm when leakage of larger quantities of the stored material occurs. Due to water production requirements, comprehensive cleaning of the collection basin and disposal of the leaked liquid and, if applicable, the collection basin material is necessary in these situations.

The object of the invention is to provide a storage container with a leak detection and retention system guaranteed to promptly trigger an alarm. Furthermore, the collection volume should be minimized to reduce spreading of the liquids hazardous to water as well as the costs of construction and maintenance.

SUMMARY OF THE INVENTION

This object is solved by a storage container for liquids hazardous to water equipped with a leak detection and retention system and having the following features:
- a channel encircling the tank, which is directly adjacent to the exterior wall of the storage container and serves to collect leaked liquid,
- at least one channel drain,
- at least one liquid collection container, as well as
- at least one detection system for the liquids hazardous to water, wherein the channel drain is design to conduct the liquid collected in the channel into the liquid collection container, which is equipped with the detection system.

DETAILED DESCRIPTION OF THE INVENTION

Figure 1:
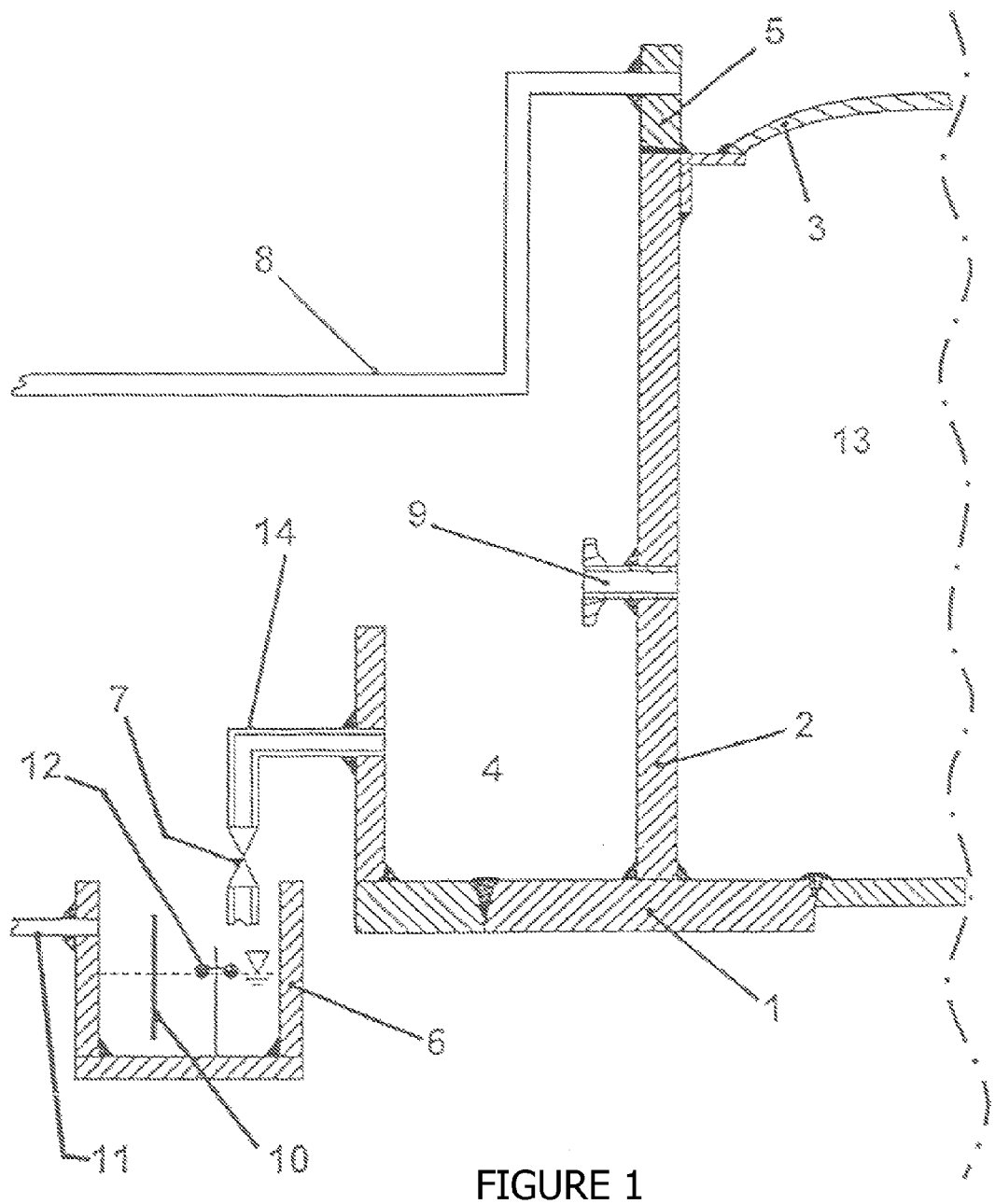
FIG. 1 depicts cross-section of an embodiment of the invention.

The tanks are preferably those that are cylindrical in shape, especially those in which the center axis of the cylinder is vertically oriented. Such tanks normally consist of a base, the vertical sidewalls, also known as cylinder shell or simply shell, as well as a roof. Both floating roofs and fixed roofs are possible. Flat-base tanks are preferred.

In such tanks, the base is preferably adjacent to or continues into the base of the storage container. The connection between the base of the channel and the base of the storage container must be designed to be liquid-tight. The inner sidewall of the channel is formed by the outer wall of the storage container or the tank shell. The cross-section of the channel is preferably U-shaped. The outer wall of the channel and the base are preferably made of steel or synthetic materials, especially fiber-reinforced synthetic materials. The material forming the channel should be resistant to the liquid hazardous to water.

In the event that the storage container is a fixed-roof tank, precipitation falling onto this fixed roof is collected by a suitable apparatus and drained away, so that it does not enter the channel. To this end, a channel system can also be installed on the tank roof, in a preferred embodiment, such that the tank shell is elevated above the tank roof. In this case, the precipitation can be drained outside the channel through a drain, such as a pipe. In this design, the liquid collection container and therefore the detection system is kept free of precipitation water from the roof area of the storage container, i.e. it is no longer necessary to account for the amount of precipitation falling on the tank roof when measuring the retention volume of the collection container and or channel.

The principal advantage of the present invention consists in the fact that the collection volume of the channel, in contrast to that of collection basins known in the art, is significantly smaller than the maximum fill volume of the storage container. The required retention volume of the channel is not solely a function of the size of the storage container and/or its maximum fill volume, but rather, in an effort to minimize safety risks, is determined in large part by the assumption of a fictitious leak surface, on the one hand, and, on the other hand, by the existing infrastructure, which makes it possible to take suitable corrective action within a specific period of time. The infrastructure includes keeping suitable equipment as well as appropriate personnel on hand so that, in the event of actual product leakage, appropriate organizational and logistic measures can be initiated to properly and promptly remove the leaked liquid, drain the affected systems, if necessary, and repair the leak.

The channel is provided with a channel drain, through which the liquid from the channel initially reaches a liquid collection container. Said container is equipped with a detection system. The collection container and drain can be heated, so that they can be kept free of ice in the water. The liquid collection container is preferably provided with an elevated drain and/or overflow mechanism. To prevent liquids hazardous to water that are not miscible with water from reaching the drain, a cascade divider can be installed in the liquid collection container between the portion into which the liquid is directed from the channel and the portion in which the drain is located.

The positioning of the divider is dependent upon whether the leaked liquid not miscible with water floats on water or sinks. The liquid collection container is equipped with a detection system, which is preferably disposed in the liquid collection container. This detection system is preferably one that detects non-conductive organic liquids that float on water, in the event that petroleum or petroleum products are stored in the tank. The channel drain is provided with a lock that automatically closes if the detection system emits a positive signal. Commercially available systems can be used as the detection system. A suitable system is, for example, a system comprising floats and a sensor whose electric resistance changes when the position of the float changes as a result of lightweight liquid floating on the water.

In practice, such a detection emits a positive signal at a specific layer thickness of, for example, 4-6 mm, normally triggering an alarm, either locally or at a measuring station. At the same time, the lock disposed in the channel drain is closed. This prevents liquids hazardous to water from flowing of the channel. The alarm prompts the operating personnel to check the storage container. In the event of actual leakage of liquid, suitable organizational and logistic measures can be initiated to promptly remove the leaked liquid, drain the affected systems, and repair the leak. The channel is preferably provided with devices that permit removal of the leaked liquid collected in the channel in a manner that is not hazardous to the environment or to water. In comparison to fill volumes of up to approx. 100,000 m3 in large flat-base tanks, the leak detection system is already capable of detecting small amounts of leaking liquids, such as those less than 10 l.

The connector pieces located on the tank for lines to supply and remove products or to connect other fixtures are preferably disposed vertically above the channel, so that, if leaks occur in these connections, the leaking liquid will also collect in the channel. To ensure that this leaking liquid is detected as quickly as possible, these connector pieces are preferably disposed in proximity to the channel drain and/or the liquid collection container. Preferably several liquid collection containers are disposed around the tank. This shortens the path between a potential leakage site and a collection container and, therefore, the time between leakage of the liquids hazardous to water and its detection.

Due to its design, the device of the invention is excellently capable of detecting leaks in the region of the tank shell, as well as of capturing and retaining the leaking liquid until corrective action can be taken.

FIG. 1 depicts a device according to the invention in cross-section. On the right side, a portion of the tank (13) is shown with a tank base (1), a tank wall (2), and a tank roof (3). This tank is a flat-base tank with a fixed roof. The U-shaped collection channel (4) is disposed on the outside of the tank, which is depicted to the left of the tank wall in the figure. The right wall of the channel is formed by the tank wall (2). The base of the channel is a continuation of the tank base (1). The left arm of the U is formed by a sidewall vertically secured to the base. A drain (14) with a lock (7) is inserted in said sidewall. When the lock is open, liquid is directed from the channel into a collection container (6) through this drain. Said collection container is equipped with a detection system (12). To ensure that floating lightweight liquid cannot escape from the collection container through the drain (11), a cascade divider (10) is installed into said collection container. Said divider protrudes above the surface of the liquid but does not extend to the base. To collect the precipitation water falling onto the fixed roof, the tank wall is elevated above the tank roof (3) by placing a segment of material (5) onto it. As a result, the precipitation water falling onto the fixed roof cannot flow down from the roof onto the tank shell, but instead is initially collected on the tank roof and is then drained away from the tank roof and over the channel (4) through a pipe (8). In the side wall (2) of the tank there is a connector piece (9) to which, for example, a line for filling or draining the tank can be connected.

Figure 2:
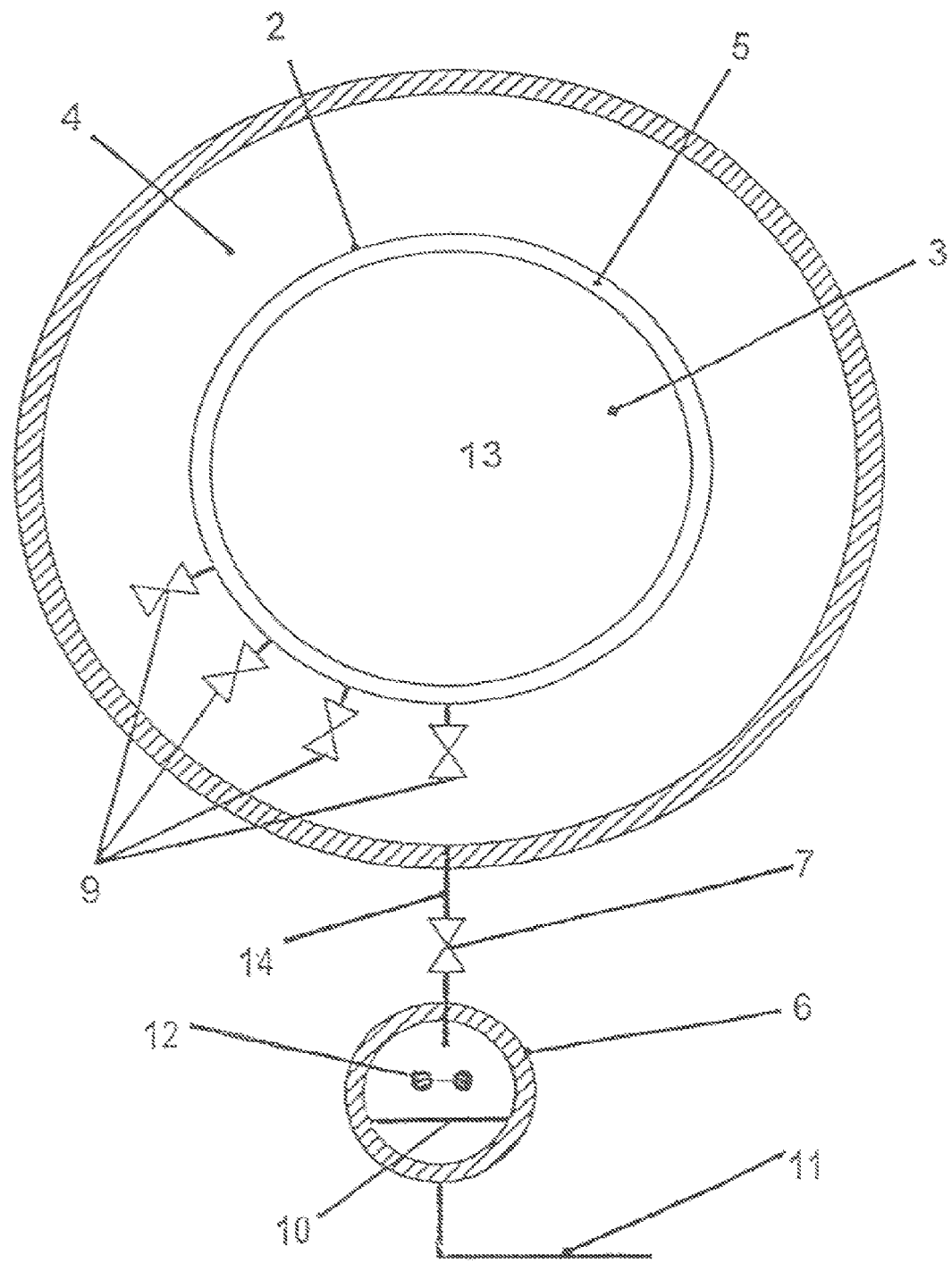
FIG. 2 depicts a top view of an embodiment of the invention.

FIG. 2 depicts a device according to the invention in a top view. In this case, there are several connector pieces (9), which are arranged so as to be in proximity to the collection container (6).

The invention claimed is:

1. A storage container for liquids hazardous to water comprising: (a) a storage tank; (b) a retention system comprising: (i) a channel encircling the tank and directly adjacent to an exterior wall of the tank which channel serves to collect leaked liquid, (ii) at least one channel drain, and (iii) at least one liquid collection container; and (c) at least one detection system; wherein the channel drain is positioned to conduct liquid collected in the channel into the liquid collection container and wherein the liquid collection container is equipped with the detection system and wherein total retention volume of the retention system is less than maximum fill volume of the tank.

2. A storage container according to claim 1, wherein the channel drain is provided with a lock, which is closed when the detection system emits a positive signal.

3. A storage container according to claim 1, wherein the liquid collection container is provided with a drain and a cascade divider.

4. A storage container according to claim 1, wherein the tank is equipped with at least one connector piece for a line configured for supply and removal of products or for other fixtures, wherein the connector piece is disposed vertically above the channel.

5. A storage container according to claim 1, wherein the detection system is configured for detection of non-conductive organic liquids that float on water.

* * * * *